J. M. SEYMOUR, Jr.
AIR COOLING AND FILTERING DEVICE.
APPLICATION FILED APR. 10, 1913.
1,130,849.
Patented Mar. 9, 1915.
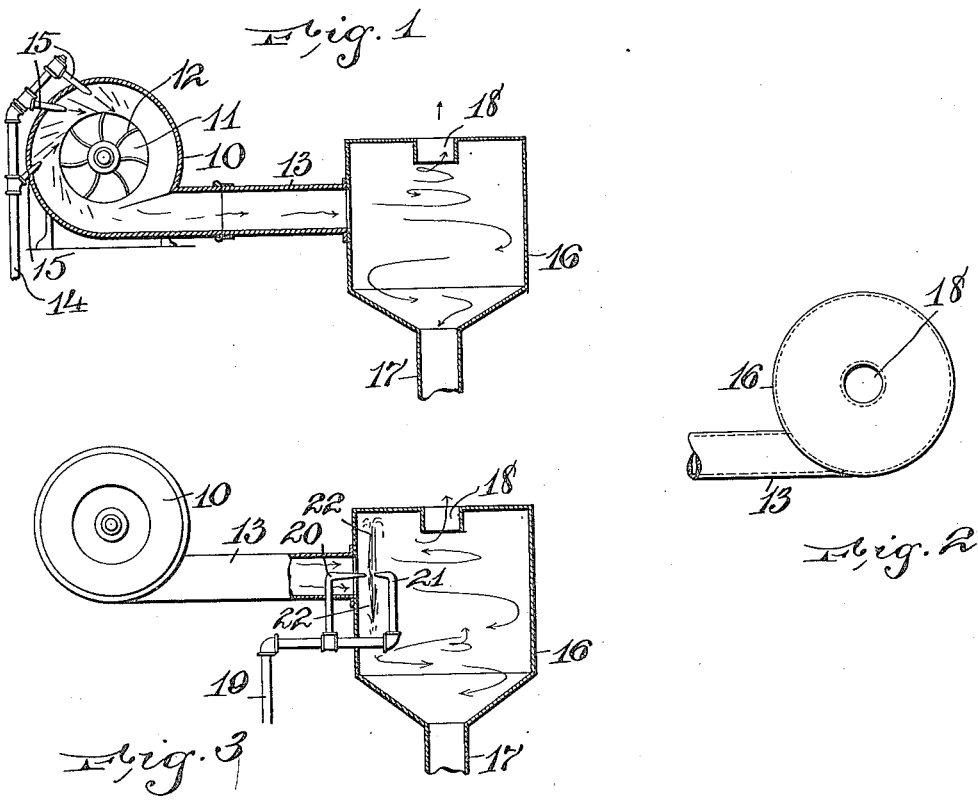

UNITED STATES PATENT OFFICE.

JAMES M. SEYMOUR, JR., OF NEWARK, NEW JERSEY.

AIR COOLING AND FILTERING DEVICE.

1,130,849.  Specification of Letters Patent.  Patented Mar. 9, 1915.

Application filed April 10, 1913. Serial No. 760,202.

*To all whom it may concern:*

Be it known that I, JAMES M. SEYMOUR, Jr., a citizen of the United States, residing at Newark, in the county of Essex and State of New Jersey, have invented certain new and useful Improvements in Air Cooling and Filtering Devices; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a device for clearing dust-laden air of its dry particles by moistening them and then separating said moistened and consequently heavier particles from the air.

The invention relates further to a device of this kind in which the separation is caused by changing the direction of the air with its moist particles so that the heavier moist particles are carried against surfaces to which they adhere, and the dry dustless air passes on to be used.

It is well known that devices have been constructed to filter the dust from air, but the usual type is so made that the moist dust or lint accumulates in the filtering medium in a way to obstruct the free passage of the air. To obviate this defect is one of the objects of my invention.

In many vocations and in certain industries it is essential that the air be cooled and humidified and also cleared of dust, devices being in use for this purpose, as evidenced by my Patent No. 494,264, granted March 28, 1893.

My present invention loads the dust particles so that their weight assists in their being separated from the air, and powders, fiber, and all kinds of dust can be easily separated when moistened by changing the direction of the moisture-laden current to impel the heavy particles against a surface from which they slip or are otherwise removed so that no accumulation, sufficient to interfere with the current of air, is possible.

The invention is illustrated in the accompanying drawing, in which—

Figure 1 is a section showing, somewhat diagrammatically, a device embodying my invention, the device illustrated employing a centrifugal drum for the separation of heavier particles from the lighter air. Fig. 2 is a top view of the separator shown in Fig. 1. Fig. 3 is a view similar to Fig. 1 with a modified form of moistening device.

In the apparatus I use any form of propelling means for drawing the air into the device, illustrating in the drawing, however, a blower 10 which receives the air from the space 11, which air is driven forcibly by the floats 12 through the tube 13 which forms a passage for the air coming from the blower. The air taken into the blower, when used in some cases, is heavily laden with dust, sometimes in the way of fiber or grindings, and in other cases, in the shape of a fine powder, which, when filtered through a screen or the like, particularly when moistened, causes the screen to be clogged, and cuts down the efficiency of the fan and makes it extremely difficult to keep the supply of air up to the required amount. To overcome this difficulty I have devised the construction embraced herein.

Adjacent to the blower 10 is a pipe 14 having suitable nozzles 15, the shape or construction of these nozzles being immaterial, the nozzles being adapted to inject moisture into the blower in the form of a spray or mist, according to the kind of dust that is to be taken from the air. The usual way of forming the spray or mist is to inject small, swift streams of water against the blades of the fan and in a direction reverse to the direction of rotation of the fan-blades so that the moisture is well dissipated in the blower, and all particles in the air are moistened. Dust particles so moistened become heavier through their absorption of the moisture and are passed through the passage 15 to well mingle the dust and the moisture to insure this moistening of all particles.

In the construction shown in Figs. 1 and 2 the pipe 13 leads tangentially into the drum 16, the drum forming in fact a centrifugal separator, the air being whirled around in the drum, and the heavier dust-laden particles are forced to the sides and eventually travel down through the outlet pipe 17, the pipe itself forming a suitable receptacle or leading into a receptacle into which the wet dirt is deposited. The air that is not laden with dust is lighter and is thus forced from the center of the drum through the air outlet 18, as will be evident.

In Fig. 3 is shown a modified form, the blower 10 and the pipe 13 being installed as in Fig. 1, but the moisture is supplied by means of a pipe 19 which is provided with a pair of nozzles 20 and 21 which are arranged opposite each other and direct a swift, small stream of water against each other, whereby a wall or screen of water 22 is formed across the current of air, and the air being compelled to pass through this wall of water, has its dust particles saturated or moistened sufficiently to permit its separation in the drum 16, in a similar manner to the separation which takes place in the construction shown in Fig. 1.

The invention is not confined to the particular form of separator, as it is evident that other forms might be devised and used, these forms being calculated to change the direction of the air so that the heavier particles are projected on suitable surfaces and thus collected without passing the air through screens or the like, which soon become clogged.

Having thus described my invention, what I claim is:—

1. An air cooling and filtering device comprising means for propelling dust-laden air, means for moistening the particles of dust, and a drum with a tangential inlet pipe from the propelling means, the drum having a centrally arranged upper outlet for the air, the drum also having a lower outlet for moistened particles.

2. In an air cooling and filtering device, a pipe for conducting air containing moistened particles, a cylindrical drum, the pipe entering the drum so as to direct the air and its particles tangentially into the drum, the drum having a centrally arranged upper outlet for the air, the drum also having a lower outlet for moistened particles, which latter outlet is adapted to receive said particles from the side walls of the drum.

In testimony, that I claim the foregoing, I have hereunto set my hand this 9th day of April 1913.

JAMES M. SEYMOUR, JR.

Witnesses:
WM. H. CAMFIELD,
M. A. JOHNSON.